US006553628B2

(12) United States Patent
Newman et al.

(10) Patent No.: US 6,553,628 B2
(45) Date of Patent: Apr. 29, 2003

(54) UNIVERSAL TOOL HANDLE CONFIGURED FOR VARIOUS EXTENSION POLE CONNECTORS

(75) Inventors: Robert D. Newman, Greenwood, MO (US); Robert D. Newman, Jr., Greenwood, MO (US); Buford J. Guittar, Greenwood, MO (US)

(73) Assignee: Specialty Products of Greenwood, Missouri, Inc., Greenwood, MO (US); part interest ( * ) Notice: Subject to any disclaimer, the term of this patent is extended or adjusted under 35 U.S.C. 154(b) by 0 days.

(21) Appl. No.: 09/682,833

(22) Filed: Oct. 23, 2001

(65) Prior Publication Data

US 2002/0020041 A1 Feb. 21, 2002

Related U.S. Application Data

(63) Continuation of application No. 09/493,296, filed on Jan. 28, 2000.

(51) Int. Cl.[7] .......................... B65G 1/04; B25G 3/18; F16B 3/06

(52) U.S. Cl. ........................ 16/427; 15/145; 15/230.11; 403/359.6

(58) Field of Search ..................... 16/115, 427; 15/145, 15/146, 230.11, 115, 427; 403/324, 325, 359.6

(56) References Cited

U.S. PATENT DOCUMENTS

| | | | | | |
|---|---|---|---|---|---|
| 5,161,278 | A | * | 11/1992 | Tomm | 16/422 |
| 5,288,161 | A | * | 2/1994 | Graves et al. | 15/145 |
| 5,333,345 | A | * | 8/1994 | O'Donnell | 16/422 |
| 5,385,420 | A | * | 1/1995 | Newman et al. | 15/145 |
| 5,579,558 | A | * | 12/1996 | Newman et al. | 16/429 |
| 5,682,641 | A | * | 11/1997 | Newman et al. | 16/429 |

* cited by examiner

*Primary Examiner*—Lynne H. Browne
*Assistant Examiner*—Ernesto Garcia
(74) *Attorney, Agent, or Firm*—Hovey Williams LLP

(57) ABSTRACT

A paint roller assembly is disclosed as including a handle that is configured for use with a variety of extension poles, each requiring a different type of connection with the handle. The handle includes a pole connector socket extending inwardly from one end thereof that is designed to receive a number of different pole connectors. The illustrated socket is provided with a tapered wall section and a circumferential groove, with the former being configured to provide a press fit attachment between the handle and connector and the latter being configured to provide a snap fit attachment between the handle and the connector. The illustrated handle is particularly designed to alternatively attach to a pole connector for use with the standard externally threaded pole, a unique connector configured specifically for use with pole having a unique push-button locking mechanism, and a tapered connector used with extension poles predominantly in Europe, although various other connectors adapted for press or snap fit attachment with the handle may be used.

22 Claims, 4 Drawing Sheets

UNIVERSAL TOOL HANDLE CONFIGURED FOR VARIOUS EXTENSION POLE CONNECTORS

CROSS REFERENCE TO RELATED APPLICATIONS

This is a continuation application of U.S. Ser. No. 09/493,296, filed Jan. 28, 2000, which is hereby incorporated by reference herein.

BACKGROUND OF INVENTION

1. Field of the Invention

The present invention relates generally to tool handles, such as a handle for a paint roller assembly. More particularly, the present invention relates to a tool handle that is configured for use with a variety of extension poles, each of which is designed to releasably connect to the handle in a different manner.

2. Discussion of Prior Art

An extension pole is commonly used in various tool applications to provide access to an area that is difficult to reach (e.g., a high section of a wall that would otherwise not be reachable unless a ladder or some other elevating structure is used). Those ordinarily skilled in the art will appreciate that the means by which the tool connects to the extension pole depends on various factors, such as the marketplace (e.g., domestic vs. European markets), the type of tool, etc. Consequently, a tool is traditionally specifically configured for and limited to use with a particular type of extension pole. Because most tools normally have a portion of the handle that is designed for connection with the extension pole, the manufacturer of any given tool must in essence have an entirely different product or, at the very least, handle construction for each type of extension pole with which the tool is likely to be used.

SUMMARY OF INVENTION

Responsive to these and other problems, an important object of the present invention is to provide a tool adapted for use with virtually every known type of extension pole. In this regard, an important object of the present invention is to eliminate manufacturer reconstruction, retooling or other significant modification to be able to offer a tool that may be used with a variety of extension poles. It is specifically an important object of the present invention to provide a tool handle that is designed to support the working element of the tool (e.g., a paint roller support frame) on any one of a variety of extension poles. Another important object of the present invention is to provide such versatile tool construction without sacrificing simplicity and low cost.

In accordance with these and other objects evident from the following description of the preferred embodiment, the present invention concerns a tool having a handle adapted for releasable connection to a variety of extension poles, wherein each of the poles is connectable to the handle in a different manner (e.g., a threaded connection, a press fit connection, a push-button locking mechanism connection, etc.). Particularly, the handle is provided with a pole connector socket extending inwardly from one end thereof. The socket is uniquely configured to receive and retain therein any one of a plurality of variously configured pole connectors without requiring modification of the handle. Each of the various pole connectors corresponds with an extension pole. For example, the connector may be provided with an internally threaded opening to permit attachment with the standard externally threaded end of an extension pole. In any case, the handle and connectors permit the tool to be used with a variety extension poles without requiring reconstruction, retooling or any other significant modification to the tool.

Other aspects and advantages of the present invention will be apparent from the following detailed description of the preferred embodiment and the accompanying drawing figures.

BRIEF DESCRIPTION OF DRAWINGS

A preferred embodiment of the invention is described in detail below with reference to the attached drawing figures, wherein.

DETAILED DESCRIPTION

Figures 1, 2:
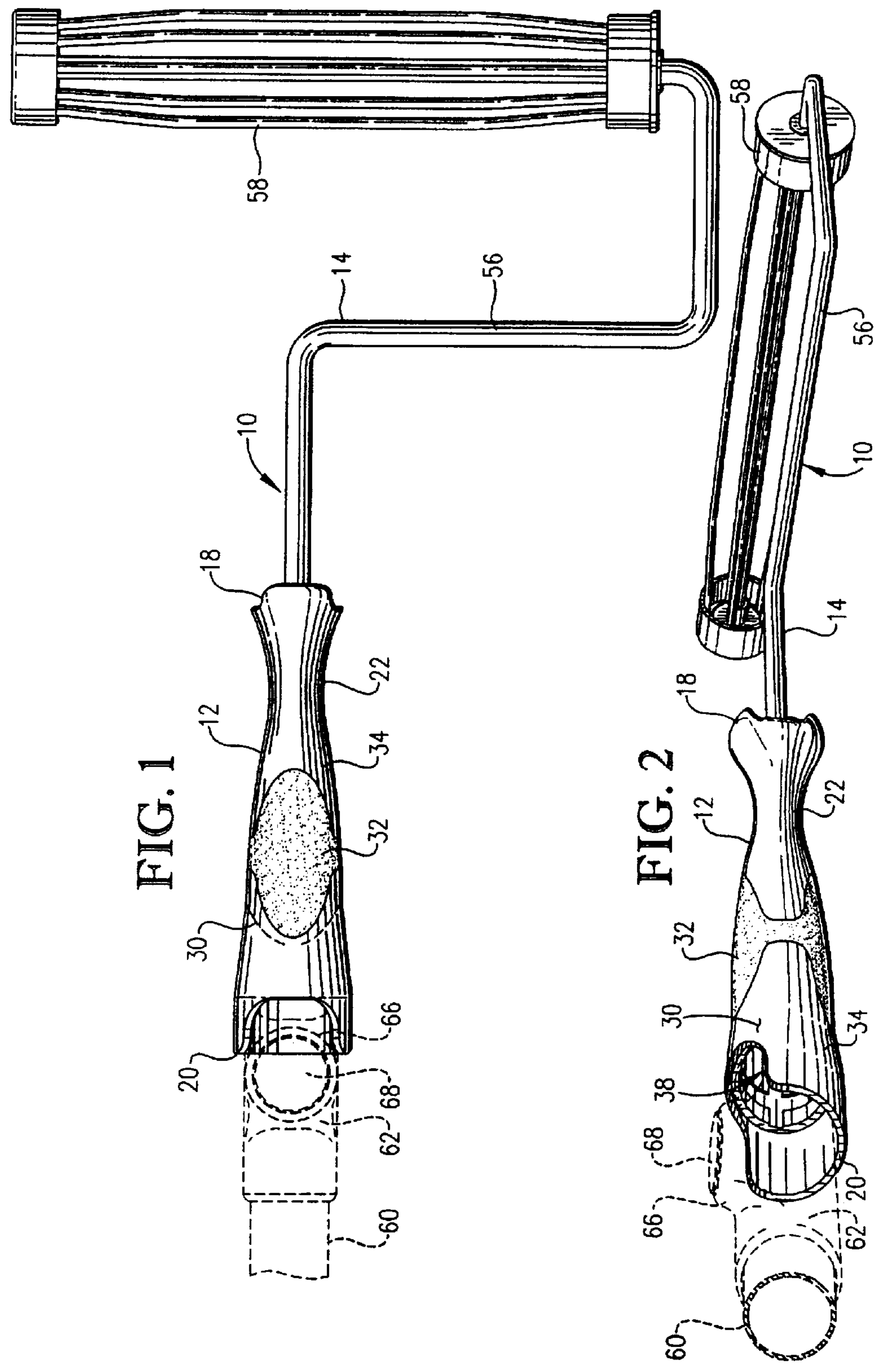
FIG. 1 is a plan view of a paint roller assembly constructed in accordance with the principles of the present invention, particularly illustrating the tool being releasably connected to an extension pole by a push-button locking mechanism arrangement.
FIG. 2 is a perspective view of the paint roller assembly.

Turning initially to FIGS. 1 and 2, the tool 10 selected for illustration comprises a paint roller assembly that is designed to rotatably support a paint roller pad (not shown) in the usual manner. Particularly, the paint roller assembly 10 generally includes a handle 12, a working element 14 in the form of a paint roller support frame projecting from the handle, and an extension pole connector 16 (e.g., see FIGS. 9–10) described in detail hereinbelow. It will be appreciated, however, that the principles of the present invention are not limited to a paint roller assembly, but rather it is entirely within the ambit of the present invention to utilize the inventive features in various other tools (e.g., a sanding tool, a screwdriver, etc).

With the foregoing caveat in mind, the illustrated tool handle or working element holder 12 presents opposite front and rear ends 18 and 20, respectively (see particularly FIGS. 3–8). The handle 12 has a generally rounded cross-sectional shape that varies in size along the length thereof. Particularly, the handle 12 is widest adjacent the rear end 20 and progressively narrows in diameter therefrom as a thumb section 22 is approached. It is noted that the thumb section 22 is the narrowest part of the handle 12. Moreover, the thumb section 22 is offset from center; that is, the thumb section is closer to the front end 18 of the handle 12 than it is to the rear end 20. The handle 12 flares or widens from the thumb section 22 to the front end 18 such that both the front and rear ends 18 and 20 are wider than the thumb section 22. As perhaps best shown in FIGS. 4 and 8, a cutout 24 extends inwardly from the front end 18 to define a pair of diametrically opposed, outwardly diverging ears 26 and 28.

The handle 12 presents an outer gripping surface 30 extending from the front end 18 to the rear end 20 and having somewhat of an hourglass shape. It will be appreciated that the handle 12 is designed so that the user's fingers wrap around the outer gripping surface 30 somewhere between the rear end 20 and the thumb section 22 and the user's thumb is placed on the thumb section 22, preferably with the thumb being oriented along the longitudinal axis of the handle and in alignment with one of the ears 26 or 28. To enhance gripping of the tool and thereby reduce the risk of tool slippage, the handle 12 is provided with a grip pad 32 along the section of the outer surface about which the fingers wrap. In the illustrated embodiment, the grip pad 32 has what is believed to be an aesthetically pleasing shape, wherein two large elliptical sections are in diametrical alignment with the ears 26 and 28 and interconnected by relatively narrow strips.

The preferred grip pad 32 is formed of a soft, nonslip elastomeric material that greatly enhances the comfort and the friction between the user's hand and the handle 12. One suitable grip pad material is a thermoplastic elastomer sold under the designation Kraton by Shell Chemical Company, although other materials may be used. It is noted that the illustrated handle 12 is formed primarily by a unitary body 34 and the grip pad 32 is located within a recess 36 defined in the body 34 so that the pad 32 forms part of the outer surface 30 (see particularly FIGS. 7 and 8). The body 34 is preferably formed of plastic, such as polypropylene (wide spec.), although other suitable materials (e.g., other types of plastic, metal, wood, etc.) may be used. It is particularly noted that the illustrated handle 12 is formed by a two step over-molding process, wherein the plastic body 34 is first injection molded and the grip pad 32 is then molded within the recess 36. Those ordinarily skilled in the art will appreciate that the principles of the present invention are not limited to the previously described handle construction, but rather the handle may be variously sized and shaped and formed of a variety of materials.

The illustrated handle 12 has an opening 38 extending axially and completely between the ends 18 and 20. It may be said that the opening 38 is divided into front and rear sections 38*a* and 38*b*, respectively, with the front section 38*a* being configured to receive a portion of the paint roller support frame 14 and the rear section 38*b* defining a pole connector socket designed to receive a variety of pole connectors. Generally speaking, the opening 38 has a circular cross-sectional shape (e.g., see FIGS. 5 and 6) that varies in size along the length of the handle 12, as will subsequently be described. Furthermore, the opening 38 is defined by an interior wall 40 that will be described in detail hereinbelow.

The frame-receiving section 38*a* of the opening 38 is defined by a portion 40*a* of the interior wall 40 extending generally between the front end 18 of the handle 12 and the rear boundary of the thumb section 22. The frame-receiving section 38*a* has a constant diameter that is smaller than any other section of the opening 38.

Figures 3, 4, 5, 6, 7, 8:
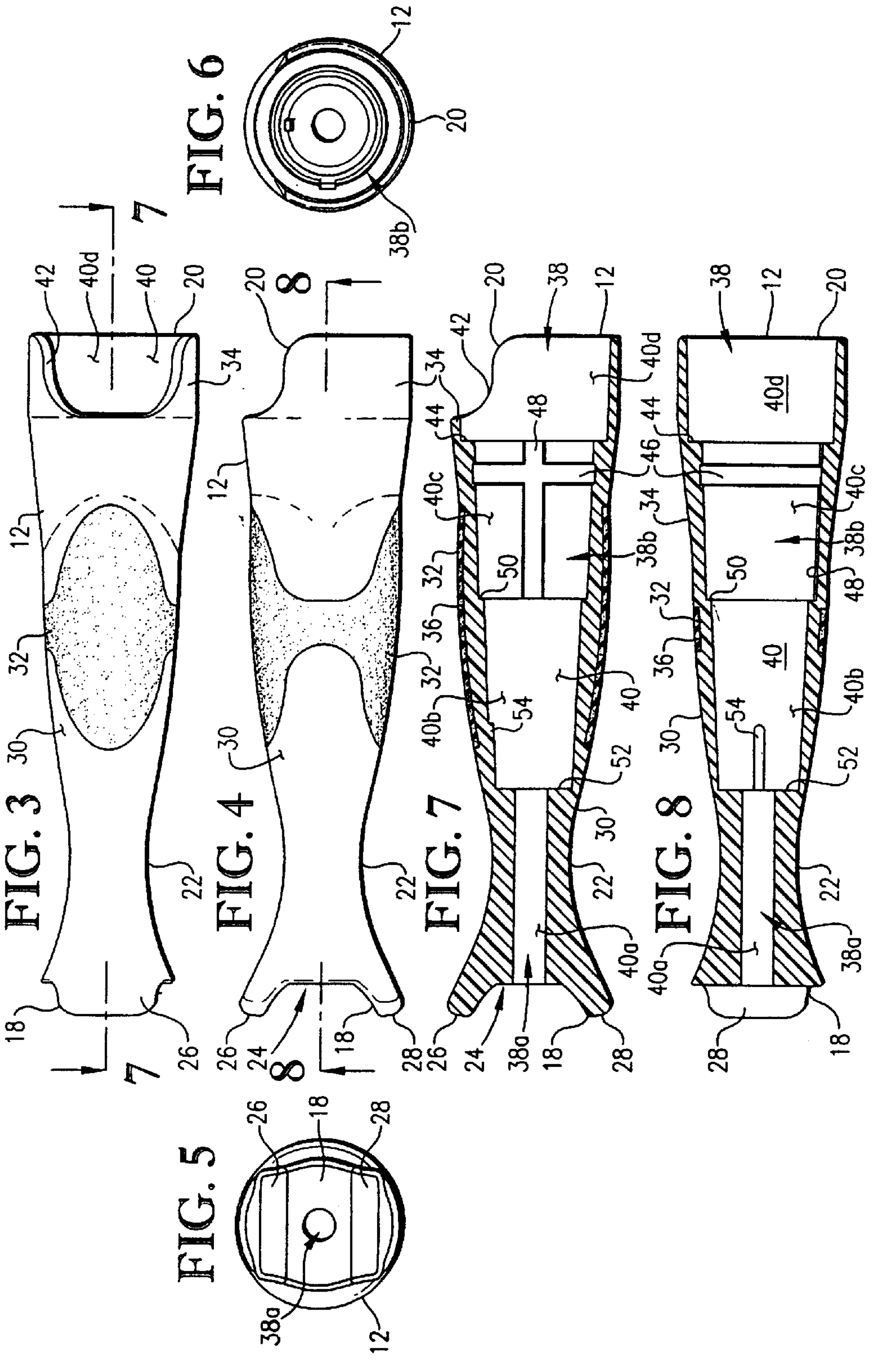
FIG. 3 is a plan view of just the handle for the assembly without the paint roller support frame or the extension pole being illustrated.
FIG. 4 is a side elevational view of the handle.
FIG. 5 is a front end elevational view of the handle, particularly illustrating the axial frame-receiving opening for receiving the bar of the paint roller support frame therein.
FIG. 6 is a rear end elevational view of the handle, particularly illustrating the pole connector socket projecting inwardly from the rear end.
FIG. 7 is cross-sectional view taken along line 7—7 of FIG. 3, particularly illustrating the configuration of the pole connector socket.
FIG. 8 is a cross-sectional view taken along line 8—8 of FIG. 4, again particularly illustrating the configuration of the pole connector socket.

With respect to the connector socket 38*b*, the interior wall 40 may be further divided into three additional portions 40*b*, 40*c*, 40*d* (see FIGS. 6–8). The widest, rearmost portion 40*d* projects from the rear end 20 of the handle 12. It is noted that the handle 12 is provided with a recess 42 extending inwardly from the rear end 29 about approximately one-third of the circumference thereof, whereby a large section of the interior wall portion 40*d* is removed. The adjacent portion 40*c* of the interior wall 40 has a smaller diameter than the rear portion 40*d* such that a shoulder 44 is defined therebetween. A circumferential groove 46 is defined in the wall 40 at a point spaced forwardly from the rear portion 40*d*. The groove 46 is intersected by a longitudinal groove 48 extending along the length of the handle 12 between the interior wall portions 40*b* and 40*d*. The innermost wall portion 40*b* of the connector socket 38*b* has an initial diameter that is smaller than that of the grooved wall portion 40*c* such that a shoulder 50 is presented therebetween. The wall portion 40*b* tapers forwardly toward the front wall portion 40*a* but remains sufficiently wider to present a shoulder 52 therebetween. As will subsequently be described, the taper is preferably provided to facilitate press fit attachment with one of the pole connectors (see FIGS. 13 and 14). The preferred angle of taper is about 3°, however, any other suitable angle may be used. An elongated projection 54 extending rearwardly from the shoulder 52 and having a rearmost rounded end projects radially inward from the interior wall portion 40*b*.

The paint roller support frame 14 has a generally standard construction. It shall therefore be sufficient to explain that the frame 14 includes a bar 56 that is slightly oversized relative to the front opening section 38*a* to be tightly received therein. Furthermore, the bar 56 may be provided with several outwardly projecting teeth (not shown) that cut into the handle 12 when the former is inserted into the latter to enhance the interconnection therebetween. The bar includes a U-shaped portion that serves to orient the center of the rotatable paint pad support 58 in general alignment with the longitudinal axis of the handle 12.

It is again noted that one of the principal advantages of the tool 10 is its capability of being used with a variety of extension poles, each being designed for releasable connection with the tool 10 in a different manner. This advantage is primarily attributable to the handle construction and the number of variously configured pole connectors attachable to the handle 12.

Figures 9, 10, 11, 12:
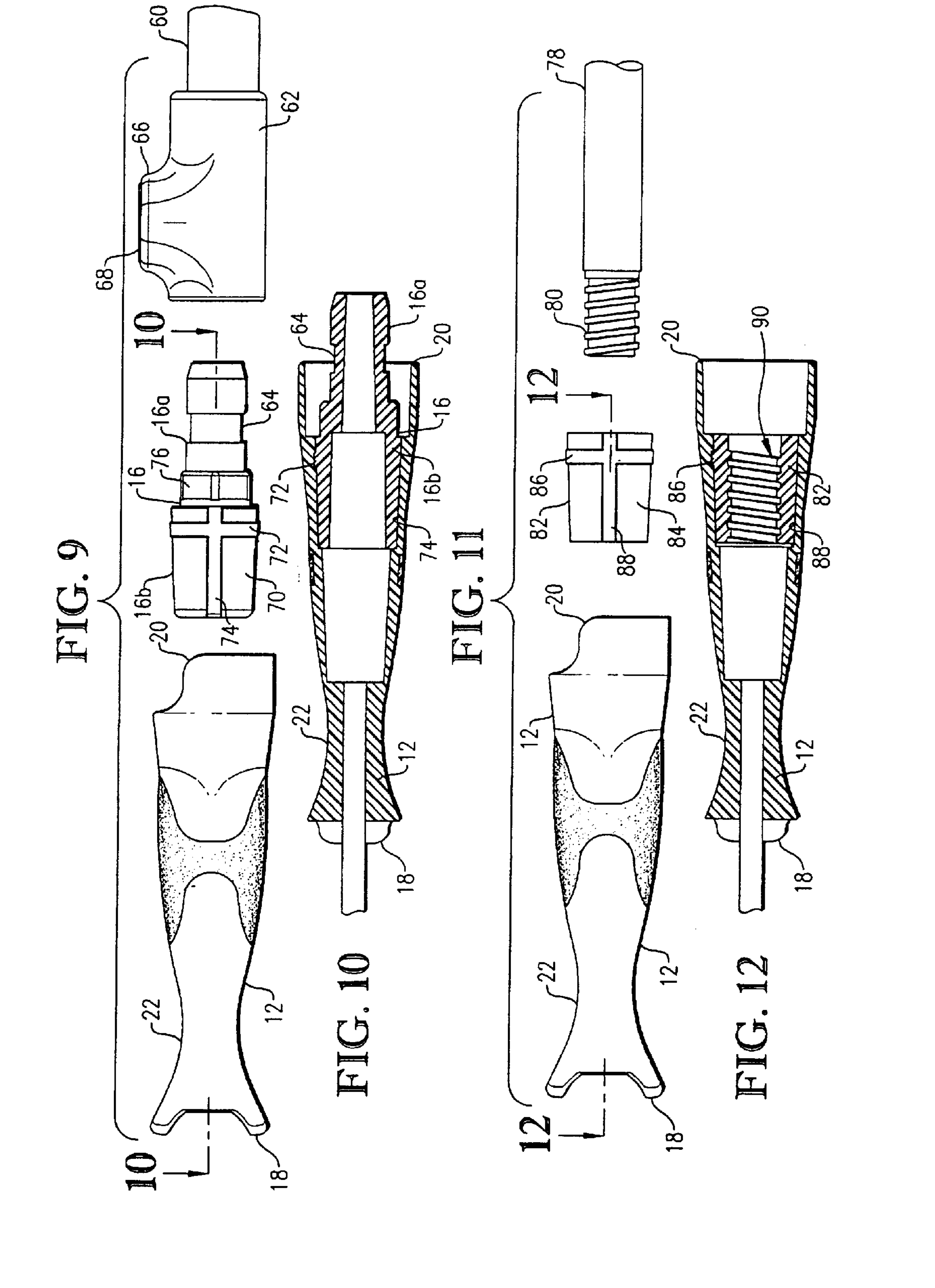
FIG. 9 is an exploded side elevational view of the handle, an extension pole having a push-button locking mechanism, and the unique pole connector configured for use with the extension pole.
FIG. 10 is cross-sectional view taken along line 10—10 of FIG. 9, but illustrating the handle and the pole connector attached.
FIG. 11 is an exploded side elevational view of the handle, an extension pole having a standard externally threaded end, and the internally threaded pole connector configured for use with the extension pole.
FIG. 12 is cross-sectional view taken along line 12—12 of FIG. 11, but illustrating the handle and the pole connector attached.

Turning first to FIGS. 9 and 10, the handle 12 is depicted with an extension pole 60 that is provided with a push-button locking mechanism 62 for releasably interconnecting the handle 12 and pole 60. The pole connector 16 (i.e., the second pole connector) includes a locking portion 16*a* that is specifically configured for use with the extension pole 60. It is particularly noted that the locking portion 16*a* and the extension pole 60 are similar to the locking assembly disclosed in U.S. Pat. No. 5,682,641, entitled TOOL HANDLE WITH LOCKING ASSEMBLY, assigned of record to the assignees of the present application, and hereby incorporated by reference herein as is necessary for a full and complete understanding of the present invention. It shall therefore be sufficient to explain that the locking mechanism 62 includes a radially reciprocating locking pin (not shown) that automatically locks within a circumferential cavity 64 defined in the locking portion 16*a* when the locking portion 16*a* is inserted into the locking mechanism 62. The upstanding rim 66 of the locking mechanism 62 houses a release button 68 which, when depressed, causes the locking pin to be removed from the circumferential cavity 66 and thereby permits the connector 16 and extension pole 60 to be disconnected.

The connector 16 also includes an attachment portion 16*b* that is sized and shaped to be fixedly held within the pole connector socket 38*b*. Particularly, the attachment portion 16*b* has an outer face 70 that corresponds with the interior wall portion 40*c*. Furthermore, a circumferential rib 72 and a longitudinal rib 74 projecting outwardly from the outer face 70 are received within the circumferential groove 46 and longitudinal groove 48, respectively (see FIG. 10). The circumferential groove 46 and rib 72 cooperatively prevent relative axial movement between the handle 12 and connector 16, while the longitudinal groove 48 and rib 72 cooperatively prevent relative rotation between the handle 12 and connector 16. In this regard, a snap fit attachment is provided that is intended to prevent detachment of the connector 16 and handle 12. As shown in FIGS. 1 and 2, the recess 42 defined in the rear end 20 of the handle receives a portion of the rim 66 therein when the tool 10 is connected to the pole 60 so as to prevent rotation of the tool 10 relative to the pole 60, although a hexagonal face 76 on the locking portion 16*a* of the connector 16 cooperates with a mating face (not shown) in the locking mechanism 62 to also restrict such relative rotation.

Thus, when the handle 12 is intended to be used with the extension pole 60 shown in FIGS. 9 and 10, the pole connector 16 is inserted into the socket 38*b* and fixedly held therein. The tool 10 may then be connected to the extension pole 60 simply by inserting the locking portion 16*a* of the connector 16 into the locking mechanism 62. The tool 10 is detached from the extension pole 60 simply by depressing the release button 68 and simultaneously pulling the tool 10 away from the pole 60.

In FIGS. 11 and 12, the handle 12 is shown in use with another type of extension pole 78 having an externally threaded end 80. Those ordinarily skilled in the art will appreciate that the pole illustrated in FIGS. 11 and 12 is the "traditional" or "standard" extension pole used in the United States. The pole connector 82 designed for use with the pole 78 includes an outer face 84 and ribs 86, 88 that are essentially identical to the attachment portion 16*b* of the connector 16 shown in FIGS. 9 and 10. In this respect, the pole connector 82 is similarly configured for fixed interengagement with the interior wall portion 40*c* of the handle 12. As shown in FIG. 12, the connector 82 has an axial, internally threaded opening 90 configured to be received on the end 80 of the pole 78. Accordingly, the tool 10 and pole 78 are connected and disconnected by threading the connector 82 on and off the end 80.

Figure 13:
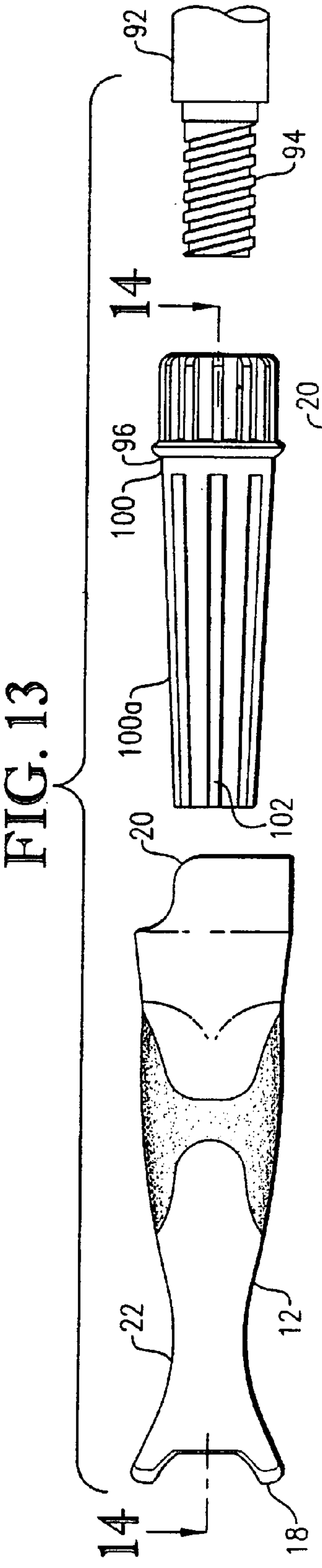
FIG. 13 is an exploded side elevational view of the handle, an extension pole having an externally threaded end, and a tapered pole connector configured for use with the extension pole.
Figure 14:
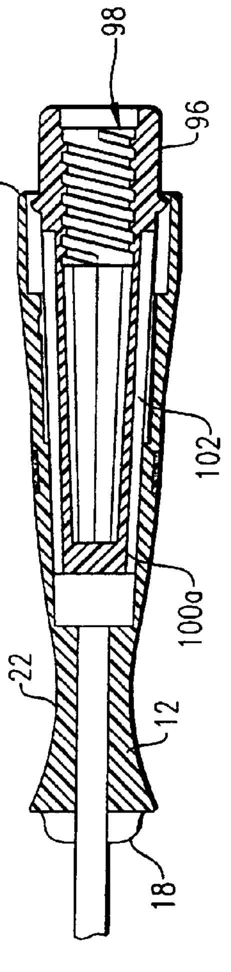
FIG. 14 is cross-sectional view taken along line 14—14 of FIG. 13, but illustrating the handle and the pole connector attached.

The tool 10 is shown with yet another type of extension pole 92 in FIGS. 13 and 14. It will be appreciated that this extension pole and the corresponding type of connection with the handle 12 is predominantly used in the European market. Similar to the pole 78 shown in FIGS. 11 and 12, the pole 92 has an externally threaded end 94, although the threads on the poles 78 and 92 are of different pitch and form. The pole connector 96 (i.e., the first pole connector) designed specifically for use with the extension pole 92 includes an axial, internally threaded opening 98 configured to be screwed onto and off the end 94. The outer face 100 of the connector 96 includes a tapered section 100*a* that narrows as the end opposite from the opening 98 is approached. The tapered section 100*a* is configured to cooperate with the tapered wall portion 40*b* of the handle 12 in providing a releasable press fit attachment between the handle 12 and connector 96. In other words, the tapered section 100*a* of the outer face 100 and the tapered wall portion 40*b* complement one another in providing removable attachment between the handle 12 and connector 96. The angle of taper of the tapered section 100*a* corresponds with the angle of taper of the interior wall portion 40*b* and, in the illustrated embodiment, is approximately 3°. A plurality of axially extending, circumferentially spaced slots 102 are defined in the tapered section 100*a* to project from the narrow end of the connector 96. Each of the slots 102 are designed to snugly receive the projection 54 extending inwardly from the tapered wall portion 40*b*, whereby the press fit attachment of the handle 12 on the connector 96 is enhanced and relative rotation between these components is prevented. Once the connector 96 has been threaded onto the extension pole 92, the handle 12 may be attached to the pole 92 simply by pressing the handle 12 onto the connector 96. Removal of the handle 12 requires the user to merely pull it from the pole 92. Of course, the tool 10 and extension pole 92 may alternatively be connected and disconnected by threading the connected 96 onto and off the pole.

Although the tool 10 has been shown with only three different types of extension poles 60,78,92, it will be appreciated that the tool 10 may be configured for use with other extension poles designed to releasably connect with the tool in further various manners. Such additional uses of the tool may simply require slight modification of the handle 12 and/or the various connectors 16, 82, 96 disclosed herein. It is also possible for all of the connectors to be configured for a single type of attachment (e.g., a press fit attachment or a snap fit attachment) with the handle, with each of the connectors varying in the type of connection with the corresponding extension pole.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A kit comprising:

a working element;

a working element holder coupled to the working element;

a first connector couplable to the working element holder; and a second connector couplable to the working element holder, said first connector presenting an outer tapered surface defining at least one slot therein, said working element holder including a first end from which the working element projects, an opposite second end, and a pole connector socket extending inwardly from the second end, said pole connector socket being at least partly defined by an inner tapered surface, said inner tapered surface presenting a protrusion, said slot receiving said protrusion when the first pole connector is inserted into the socket.

2. The kit according to claim 1, said second pole connector presenting at least one longitudinal rib.

3. A kit for use with a variety of extension poles, wherein the tool is releasably connectable to the poles in different manners, said kit comprising:

a working element;

a handle including a first end from which the working element projects, an opposite second end, and an outer gripping surface that extends between the first and second ends and is configured to be gripped by the hand of a user, said handle including a pole connector socket that extends inwardly from the second end of the handle, said pole connector socket defining a longitudinal groove;

a first pole connector couplable to the handle by a press-fit connection when inserted into the socket; and a second pole connector presenting a longitudinal rib and couplable to the handle by a snap-fit connection when inserted into the socket, said longitudinal groove receiving said longitudinal rib to thereby restrain rotation between the second pole connector and the handle when the second pole connector is inserted into the socket, said socket being defined at least in part by a first interior wall section which forms the snap-fit connection with the second pole connector when the second pole connector is inserted into the socket, said socket being defined at least in part by a second interior wall section which forms the press-fit connection with the first pole connector when the first pole connector is inserted into the socket, said first pole connector defining an outer tapered surface, said second interior wall defining an inner tapered surface, said outer and inner tapered surfaces at least partly forming the press-fit connection when the first pole connector is inserted into the socket.

4. The kit as claimed in claim 3, said outer tapered surface defining at least one slot therein, said inner tapered surface presenting a protrusion, said slot receiving said protrusion to thereby restrain relative rotation between the first pole connector and the handle when the first pole connector is inserted into the socket.

5. The kit as claimed in claim 3, said second pole connector presenting a circumferential rib, said first interior wall section defining a circumferential groove, said circumferential rib and said circumferential groove at least partly forming the snap-fit connection when the second pole connector is inserted into the socket.

6. The kit as claimed in claim 5, said first interior wall defining said longitudinal groove.

7. The kit as claimed in claim 3, said first pole connector adapted to be threadably coupled to one of the extension poles.

8. The kit as claimed in claim 3, said second pole connector adapted to be coupled to another of the extension poles by an attachment mechanism other than threads.

9. The kit as claimed in claim 8, said attachment mechanism comprising a push-button locking mechanism.

10. A tool for use with a wide variety of extension poles, wherein the tool is releasably connectable to the poles in different manners, said tool comprising:

a working element;

a handle including a first end from which the working element projects, an opposite second end, and an outer gripping surface that extends between the first and second ends and is configured to be gripped by the hand of a user, said handle including a pole connector socket that extends inwardly from the second end of the handle, said socket defining an inner tapered surface which presents a protrusion;

a first pole connector defining an outer tapered surface couplable to the handle by a press-fit connection when inserted into the socket, said outer tapered surface defining at least one slot therein, said slot receiving said protrusion to thereby restrain relative rotation between the first pole connector and the handle when the first pole connector is inserted into the socket; and a second pole connector couplable to the handle by a snap-fit connection when inserted into the socket.

11. The kit as claimed in claim 10, said socket being defined at least in part by a first interior wall section which forms the snap-fit connection with the second pole connector when the second pole connector is inserted into the socket, said socket being defined at least in part by a second interior wall section which forms the press-fit connection with the first pole connector when the first pole connector is inserted into the socket.

12. The kit as claimed in claim 11, said second interior wall defining the inner tapered surface, said outer and inner tapered surfaces at least partly forming the press-fit connection when the first pole connector is inserted into the socket.

13. The kit as claimed in claim 11, said second pole connector presenting a circumferential rib, said first interior wall section defining a circumferential groove, said circumferential rib and said circumferential groove at least partly forming the snap-fit connection when the second pole connector is inserted into the socket.

14. The kit as claimed in claim 13, said second pole connector presenting a longitudinal rib, said first interior wall section defining a longitudinal groove, said longitudinal groove receiving said longitudinal rib to thereby restrain relative rotation between the second pole connector and the handle when the second pole connector is inserted into the socket.

15. The kit as claimed in claim 10, said first pole connector adapted to be threadably coupled to one of the extension poles.

16. The kit as claimed in claim 10, said second pole connector adapted to be coupled to another of the extension poles by an attachment mechanism other than threads.

17. The kit as claimed in claim 16, said attachment mechanism comprising a push-button locking mechanism.

18. A kit for use with a variety of extension poles, wherein the tool is releasably connectable to the poles in different manners, said tool comprising:

a working element;

a first pole connector including threads adapted to threadably couple the first pole connector to one of the extension poles;

a second pole connector defining a circumferential cavity for coupling the second pole connector to another of the extension poles;

a handle including a first end from which the working element projects, an opposite second end, and an outer gripping surface that extends between the first and second ends and is configured to be gripped by the hand of a user, said handle including a pole connector socket that extends inwardly from the second end of the handle and receives either of the pole connectors in such a manner that the handle is attached to the first or second pole connector regardless of the manner in which the first or second pole connector is configured to connect the tool to said variety of extension poles, said socket being defined at least in part by a first interior wall adapted to form a snap-fit connection with one of the pole connectors when said one of the pole connectors is inserted into the socket, said socket defined at least in part by a second interior wall section adapted to form a press-fit connection with the other of the pole connectors when said other of the pole connectors is inserted into the socket, said first pole connector defining an outer tapered surface, said second interior wall defining an inner tapered surface, said outer and inner tapered surfaces at least partly forming the press-fit connection when the first pole connector is inserted into the socket.

19. The kit as claimed in claim 18, said circumferential cavity being defined in an outer surface of the second pole connector and adapted to form a push-button connection with said another of the extension poles.

20. The kit as claimed in claim 18, said outer tapered surface defining at least one slot therein, said inner tapered surface presenting a protrusion, said slot receiving said protrusion to thereby restrain relative rotation between the first pole connector and the handle when the first pole connector is inserted into the socket.

21. The kit as claimed in claim 18, said second pole connector presenting a circumferential rib, said first interior wall section defining a circumferential groove, said circumferential rib and said circumferential groove at least partly forming the snap-fit connection when the second pole connector inserted into the socket.

22. The kit as claimed in claim 21, said second pole connector presenting a longitudinal rib, said first interior wall section defining a longitudinal groove, said longitudinal groove receiving said longitudinal rib to thereby restrain relative rotation between the second pole connector and the handle when the second pole connector is inserted into the socket.

* * * * *